Feb. 22, 1944. A. N. WEEKS 2,342,565
BALES
Filed Sept. 2, 1941 3 Sheets-Sheet 1
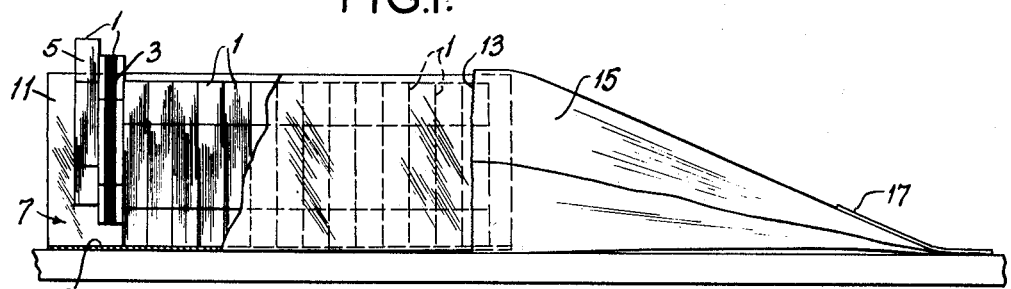
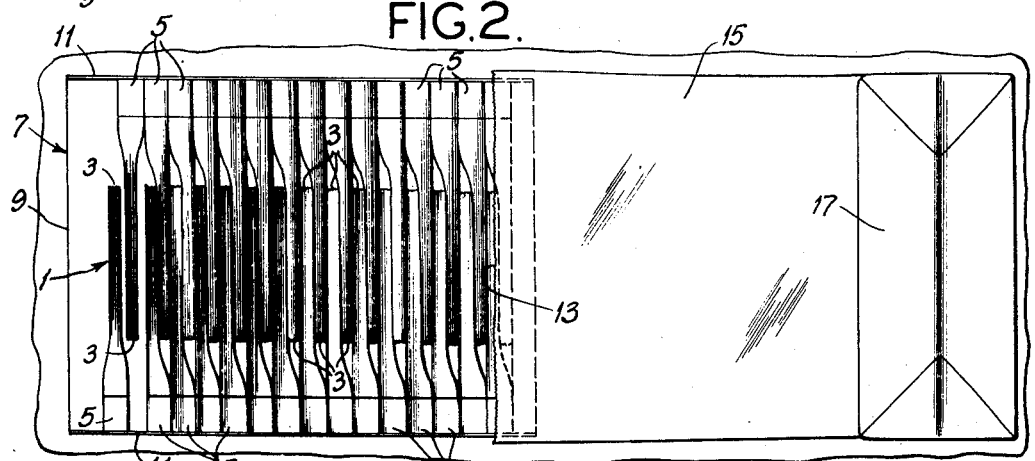
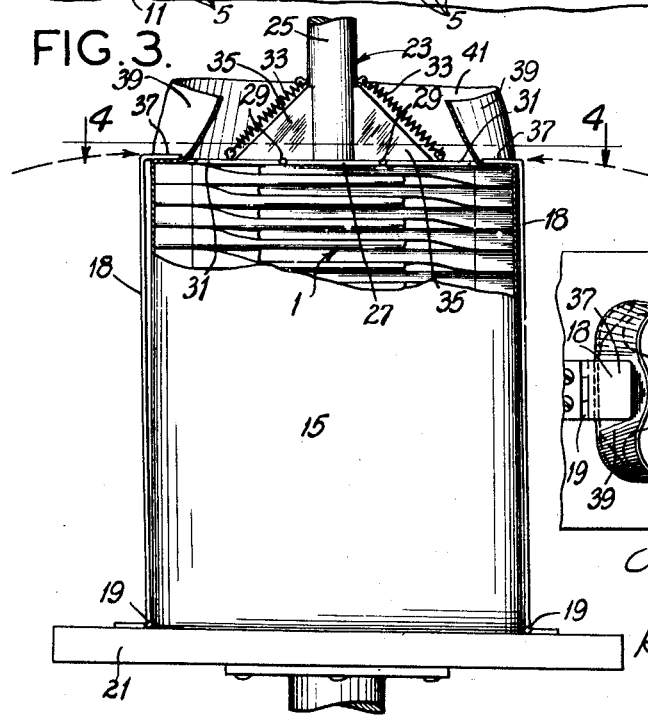
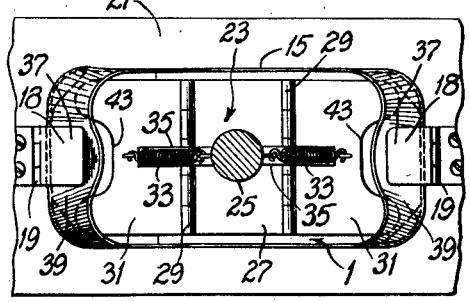
Arnold N. Weeks,
Inventor.
Haynes and Koenig,
Attorneys.

Feb. 22, 1944. A. N. WEEKS 2,342,565
BALES
Filed Sept. 2, 1941 3 Sheets-Sheet 2

Arnold N. Weeks,
Inventor.
Haynes and Koenig
Attorneys.

Feb. 22, 1944.  A. N. WEEKS  2,342,565
BALES
Filed Sept. 2, 1941  3 Sheets-Sheet 3

Patented Feb. 22, 1944

2,342,565

UNITED STATES PATENT OFFICE 2,342,565

BALES

Arnold N. Weeks, North Scituate, Mass., assignor to Bemis Bro. Bag Company, St. Louis, Mo., a corporation of Missouri Application September 2, 1941, Serial No. 409,169

2 Claims. (Cl. 206—65)

This invention relates to bales, and with regard to certain more specific features, to bales for baling bags and the like for transportation.

Among the several objects of the invention may be noted the provision of a compact, firm, well-compressed and shaped container or bale for bags and the like, which is neater and more easily handled than the package heretofore used and in which chafing and deformation of the contents is avoided. Other objects will be in part obvious and in part pointed out hereinafter.

The invention accordingly comprises the elements and combinations of elements, features of construction, and arrangement of parts which will be exemplified in the structures hereinafter described, and the scope of the application of which will be indicated in the following claims.

In the accompanying drawings, in which are illustrated several of various possible embodiments of the invention, Fig. 1 is a side view showing a baling tray associated with a receiving cover;

Fig. 2 is a plan view of Fig. 1;

Fig. 3 is a vertical section showing a filled container applied to baling apparatus;

Fig. 4 is a plan view perpendicular to line 4—4 of Fig. 3, showing a presser foot;

Similar reference characters indicate corresponding parts throughout the several views of the drawings.

Figure 6:
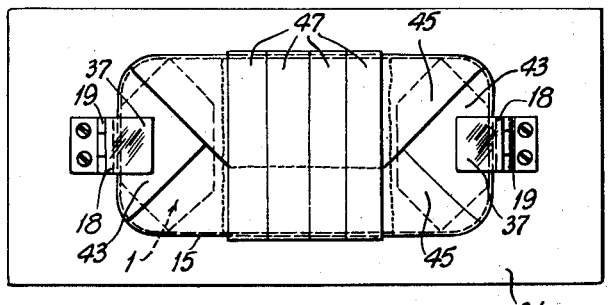
Fig. 6 is a plan view of Fig. 3, with the presser foot removed and a closure operation completed.

Heretofore the method of packaging paper bags for transportation was to apply wrapping paper around compressed groups of the bags and then to tie these with baling rope.

According to the present method the bags are inserted into an outside covering bag, and then pressed together preparatory to closing the bag into position to act as a bale to contain the bags and hold the compression, thus to form a well-filled, solid bag or bale.

Referring now more particularly to Figs. 1 and 2, numerals 1 indicate groups of the bags which are to be packaged. In each group is a number of flat bags, say for example twenty-five. The bag mouths are at 3 and the bottoms are at 5. Since the bottom end of such a group is thicker than the mouth end, due to the construction of the bags composing the group, the groups are arranged alternatively with their mouths directed inward, as shown in Fig. 2 but falling short of the bottoms to the extent that the bottom ends substantially determine the form of the final package. In the case of bevelled bottoms the resulting bale becomes eight-sided, as will appear. In the case of non-bevelled bottoms the resulting bale becomes four-sided. This alternate inward direction of the mouth ends and outward direction of the bottom ends is employed in order to obtain a column or pile of the bags which is of equal length on both sides and to allow the edges of the bottoms alone to determine the corner shapes of the bale. It also substantially equalizes throughout the cross section of the stack compressive forces which are subsequently applied. In order properly to form the column, the bags are stacked on edge horizontally in a U-shaped tray 7. This tray has a bottom 9 and side walls 11 for guide purposes.

The tray is partially inserted into the open mouth 13 of a larger paper sack or bag 15 (Figs. 1 and 2) which is to form the bale cover or baling material. This bag 15 is closed at its bottom as shown at 17. After all of the bags which will be accommodated by the baling cover or bag 15 have been inserted into the tray to form a stack, they are pushed endwise into 15, which opens automatically under the air pressure engendered ahead of the bags as they enter. The cross sectional area of the stack is substantially equal to that of the space in the sack when expanded. Thus the cross sectional area of the stack is about equal to that of the resulting bale and its bottom closure.

It has been found to be unsatisfactory simply to insert the bags 1 into the holding bag 15 and then to close the latter, because of the tendency of the interior bags 1 to become uneven laterally and to separate into a loose condition endwise. It is desirable to have a compressed condition of the interior bags so that the exterior covering bag 15 acts as a bale or tensioning cover.

Figure 5:
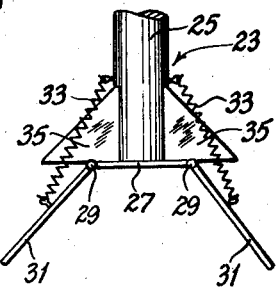
Fig. 5 is a fragmentary detail in side elevation of said presser foot as it appears during withdrawal.

In order to accomplish the desired ends, the loaded bag 15 is placed upright (Fig. 3) next to a pair of clamps 18, which are hinged at 19 on a platform 21. Prior to swinging the clamps 18 to the position shown in Fig. 3, a presser foot 23 is brought down into position within the bag 15. This presser foot is detailed in Fig. 5 and consists of a stem 25 on which is a lower pad 27. Hinged to the pad 27 at 29 are flukes 31 which are normally biased up into the flatwise position shown in Fig. 3. This is done by means of springs 33. The flukes are limited in their upward movement by triangular stops 35. The possibilities of downward movement upon withdrawal are indicated in Fig. 5, this movement being against the bias of springs 33.

As the presser foot is brought down into the completely open mouth 41 of bag 15, the flukes are horizontal, as shown in Fig. 3. This is accomplished by relative movement between the table 21 and the stem 25. It is not of importance which moves, the table 21 or the stem 25. The important thing is the relative movement which brings about compression of the bags within the baling cover 15. The degree of compression is such that the uppermost group of bags is brought just under the final positions of fingers 37 on said clamps 18, which are now swung into position so that portions 39 of the open mouth 41 of the bag are partially folded in over the ends of the contained bags. For this purpose the flukes are provided with clearing notches 43 (Fig. 4).

Next, the platform 21 and the stem 25 are separated, which causes a withdrawal of the presser foot from out of the mouth 41 of bag 15. Any interference with the ends of the flukes 31 by the partially closed portions 39 of the mouth is provided for by the flukes rotating downwardly and stretching the springs 33 as indicated in Fig. 5. This is in response to dragging contact by the flukes with the partially closed portions 39 of the mouth of bag 15. In other words, the presser foot is collapsible in response to contact with the partially closed bag mouth as the presser foot is withdrawn.

Figure 9:
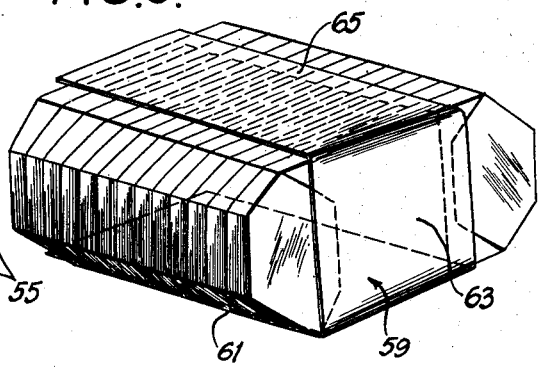
Fig. 9 is a perspective view showing another modification.
Figure 10:
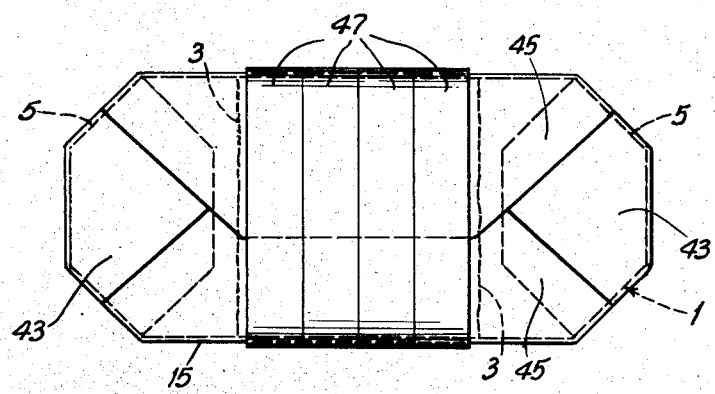
Fig. 10 is a plan view of a completed and loaded bale.
Figure 11:
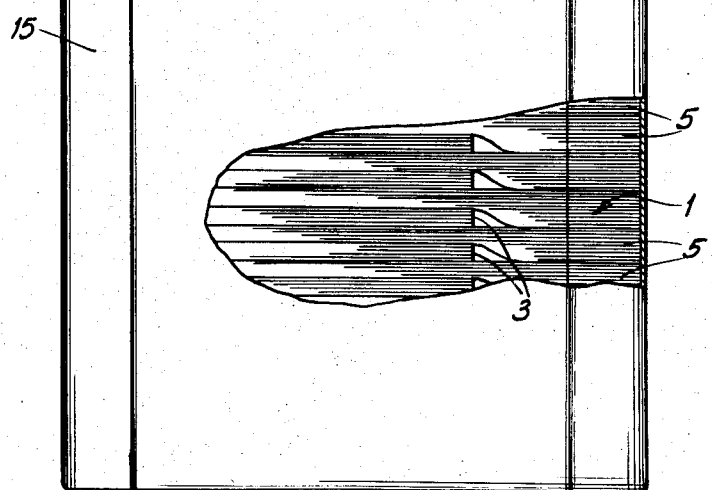
Fig. 11 is a front elevation of Fig. 10.

Next, the operator folds shut the open mouth as indicated in Fig. 6. At this time the fingers 37 have determined endwise flat regions 43, over which are folded sidewise flat flaps 45, one of the flaps 45 being over the other. Compression is maintained substantially evenly throughout the cross section of the contained stack of paper bags because of their alternate stacked positions. This compression is parallel to the axis of the stack. Then holding strips 47 are adhered over the end of the bale, and thereafter the clamps 18 are swung outward to free the finger 37 from holding position above the bale. Thereafter, the compressed bags which form the contents of the bale 15 spring apart, because of their relative elasticity upon release. Thus the contents of the bale are under tension and the result is a neat, tight package having a plurality of solid flat sides and solid flat ends, which would not be obtained simply by inserting bags into a baling bag and closing it. This is clear from Figs. 10 and 11, from which it will be seen that the cover fits the compacted bags so that the resulting package is a solid parallelepiped of eight longitudinal sides and two end faces. This is partly because the corners of the bag mouths are arranged short of the angled corners at the bottom (note Fig. 9) and also because of the accordion-like pulling that the bags exert upon the cover which makes a tight girthwise fit as indicated in Figs. 10 and 11.

Figure 7:
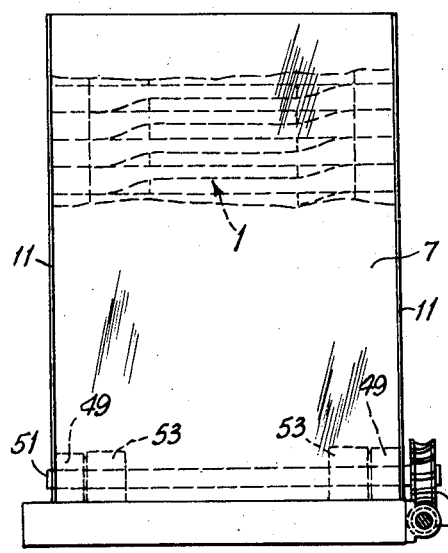
Fig. 7 is a front elevation of a tray used according to an alternative method of producing the invention.
Figure 8:
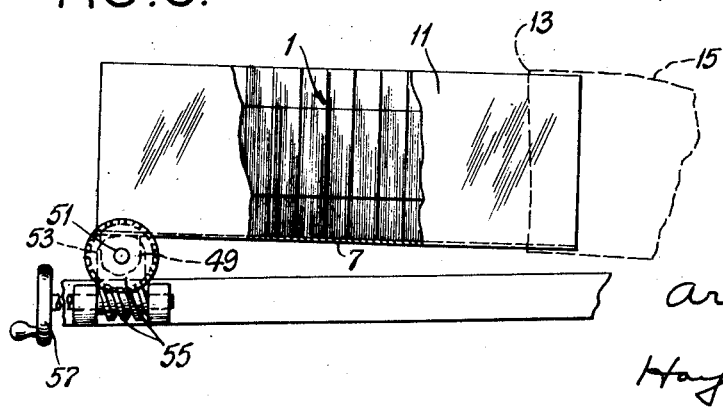
Fig. 8 is a side elevation of the tray of Fig. 7 indicated in a turned-down position.

In Figs. 7 and 8 the tray 7 is shown provided with ears 49 and a rotary shaft 51, the latter passing through bearing blocks 53. The shaft 51 is under control of a gearing 55, operable from a hand wheel 57, so that the tray 7 may be moved from a vertical position to a more or less horizontal position.

In Fig. 7 the tray 7 is shown vertical, and in dotted lines is shown how the bags are applied in the tray. In Fig. 8, the loaded tray is shown as having been turned down and the mouth 13 of a baling bag 15 brought into position over the end of the tray, preparatory to pushing the contents of the tray into the baling bag. From this point on, the operations are the same as those described in connection with Figs. 3–5.

If desired, instead of using a rigid tray for aligning the bags preparatory to placing them in the baling bag 15, a strip of paper 59 may be laid down and after placing alternate groups of the bags upon one reach 61 of said paper, it is brought around the end of the column of bags as indicated at 63, and then over them as indicated at 65. This forms a cradle. Then the assembly of Fig. 9 is manipulated so that the end 63 is inserted into the mouth 13 of the baling bag 15, the paper 59 being left in the package. Thereafter, the bale is manipulated along the lines described in connection with Figs. 3–5.

One of the principal features and advantages of this invention is the use of a widely diffused or dispersed retention of the compressive force, originally imposed, by the bale-forming bag which performs the double function of a tension medium and a protective cover, to produce generalized restraint with the elimination of concentrated points of force as produced by ropes, steel bands, wires, or other localized restraining mediums which cause cutting, chafing, distortion, wrinkling and other defects and damages.

Another advantage arises from the holding of inner bags under generalized compression in the compact alternating edgewise arrangement shown. This produces a solid and compact unit which naturally stacks and handles so that bags remain in edgewise position at all times. Such position completely eliminates resilience and spring which is characteristic of ordinary bales and bundles of bags and eliminates damage from rubbing and chafing in shipping which is unavoidable in irregularly shaped resilient bundles of bags produced by other methods.

Another advantage of this invention consists in its economy of materials, since only a minimum of overlap is used at all points and by utilizing the tensile strength of the covering bag the use of ropes, wires, straps, etc., is entirely eliminated.

Another advantage of the invention is the fact that the accordion-like expansion of the contents within the bale-forming bag 15 serve to tension the entire surface of the bale and to provide a neat appearance. In addition, loading is relatively easy, considering the results obtained. For example, no ordinary wrappings are needed or baling bands. The advantages of a bale are obtained by using an ordinary bag. This feature of the invention is a result of the method of filling, compressing, and closing.

The invention saves wrapping material, because the preformed bag 15 requires only small overlapping portions at its seams; whereas the former wrapping sheets needed to be overlapped several inches to form an effective package.

In addition, the present method allows of stacking a greater number of bags in one stack without the danger of sidewise slippage. In this connection, it may be noted that the clamps 18 are positioned right next to the opposite ends of the stack, and serve alignment purposes during the compressive operation of the presser foot. Thus the side clamps hold the sides of the container bag 15 and also hold the contained bags compressed.

It is of substantial importance that the presser foot perform its pressing operation near the ends of the contained bags, and not only at the center, so that the ends do not spring up. This means that the tucked-in portions 39 of the bag mouth will necessarily interfere with withdrawal of the presser foot, unless it is collapsibly constructed, as above described. Thus it will be seen that a presser foot of substantial expansion and collapsibility upon withdrawing movement is important.

It is to be understood that the final article consists of a stack of bags which have their mouths alternately oppositely directed and lying adjacent to (as distinguished from overlapping) the bottom portions of alternate bags, all compressibly assembled in a bale which is stretched and tensioned by the normal tendency of the bags to expand therein.

In accordance with the requirements of Patent Office Rule 43, attention is directed to applicant's copending divisional United States patent applications, Serial Nos. 472,335 and 472,336 for Baling method and Baling mechanism respectively, both filed January 14, 1943.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A paper bale containing a compressed stack of paper bags comprising outer baling material formed as a completely enclosing paper sack having a closed bottom, the cross section of the sack and the shape of its bottom being similar, the contained paper bags having bottoms folded against their sides to form relatively thick ends having bevelled corners opposite which are the relatively thin mouth ends of the bags, said paper bags being flatwise in the bale parallel to said closed bottom with their thin mouth portions stacked adjacent to one another and directed toward the center of the bale and forming a stack, the thick bevelled-corner ends of portions of the stack of bags being alternately directed oppositely and located respectively adjacent to a side of the bale, the mouth portions being spaced inwardly from said bevelled corners enough to allow the corners alone to determine the corner shape of the bale, the cross-sectional area of the stack being arranged to be substantially equal to that of said bale and its bottom, and a closure on the bale spaced with respect to the bottom of the bale to maintain compression parallel to the axis of the stack of paper bags but substantially evenly throughout its cross section, the resulting bale having eight substantially flat solid sides, and two substantially flat ends formed by the substantially flat contained bags.

2. A paper bale containing a compressed stack of paper bags comprising outer baling material formed as a completely enclosing paper sack having a closed bottom, the cross section of the sack and the shape of its bottom being uniform, the contained paper bags having bottoms folded against their sides defining inner and outer edges, said bottoms when so folded forming relatively thick ends opposite which are the relatively thin mouth ends of the bags, said paper bags being arranged in groups, each group reversed end to end with respect to an adjacent group, said paper bags being flatwise in the bale parallel to said closed bottom of the bale with their thin mouth portions stacked adjacent to one another and directed toward the center of the bale, the thick ends of alternate groups of bags being oppositely directed and located respectively adjacent to opposite sides of the bale, the mouth edge portions of each bag group terminating short of the inner edge of the bottom of the next adjacent bag group to allow said outer bag bottom edges alone to determine the corner shape of the bale, the cross-sectional area of the stack being arranged to be substantially equal to that of said bale and its bottom, and a closure on the bale spaced with respect to the bottom of the bale to maintain compression parallel to the axis of the stack of paper bags and substantially evenly throughout its cross section, the resulting bale having a plurality of flat solid sides depending on the number of side edges of the folded bags, and substantially flat ends formed by the substantially flat surfaces of the contained bags.

ARNOLD N. WEEKS.